US011258251B2

(12) United States Patent
Heinemann et al.

(10) Patent No.: US 11,258,251 B2
(45) Date of Patent: Feb. 22, 2022

(54) ARRANGEMENT FOR PROTECTING ELECTRICAL LOADS AND THE CONNECTION LINES THEREOF FROM OVERCURRENT

(71) Applicant: Phoenix Contact GmbH & Co. KG, Blomberg (DE)

(72) Inventors: Michael Heinemann, Lage (DE); Hartmut Henkel, Blomberg (DE); Schmidt Olaf, Soest-Müllingsen (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 46 days.

(21) Appl. No.: 16/467,873

(22) PCT Filed: Dec. 7, 2017

(86) PCT No.: PCT/EP2017/081923
§ 371 (c)(1),
(2) Date: Jun. 7, 2019

(87) PCT Pub. No.: WO2018/104486
PCT Pub. Date: Jun. 14, 2018

(65) Prior Publication Data
US 2020/0091710 A1 Mar. 19, 2020

(30) Foreign Application Priority Data

Dec. 8, 2016 (LU) .......................................... 93345

(51) Int. Cl.
*H02H 9/02* (2006.01)
*H02H 3/08* (2006.01)

(52) U.S. Cl.
CPC .............. *H02H 9/025* (2013.01); *H02H 3/08* (2013.01)

(58) Field of Classification Search
CPC .......... H02H 9/025; H02H 3/08; H02H 3/006; H02H 3/02; H02H 9/02; H02M 3/025; H02M 3/04; H02M 3/044; H02M 7/261
See application file for complete search history.

(56) References Cited

U.S. PATENT DOCUMENTS 5,266,838 A * 11/1993 Gerner .................... G05F 1/577
307/19
9,899,826 B2 * 2/2018 Fomenko ............. H02H 3/0935
(Continued)

FOREIGN PATENT DOCUMENTS

CN 1320991 A 11/2001
CN 102046428 A 5/2011
(Continued)

*Primary Examiner* — Matthew V Nguyen
(74) *Attorney, Agent, or Firm* — Holland & Hart LLP

(57) ABSTRACT

A protective arrangement includes an input configured to receive an input current from a current supply; one or more outputs configured to connect to one or more connection lines to supply current to one or more electric loads; one or more current supply paths arranged between the input and the one or more outputs; a first path circuit breaker and a second path circuit breaker in a series connection in a current supply path of the one or more current supply paths and configured to interrupt a current flow in the current supply path; and one or more setting units configured to set a trip current for at least one of the first path circuit breaker or the second path circuit breaker.

14 Claims, 7 Drawing Sheets

(56) References Cited

U.S. PATENT DOCUMENTS

| | | | |
|---|---|---|---|
| 2004/0130839 A1* | 7/2004 | Bo | H02H 7/30 |
| | | | 361/92 |
| 2012/0099236 A1 | 4/2012 | Cyuzawa et al. | |
| 2013/0000330 A1* | 1/2013 | Tsuruma | F25B 49/025 |
| | | | 62/126 |
| 2013/0188285 A1* | 7/2013 | Hsiao | H01L 31/02021 |
| | | | 361/42 |
| 2014/0103990 A1 | 4/2014 | Holley et al. | |
| 2015/0028991 A1* | 1/2015 | Chora De La Garza | |
| | | | H01H 71/164 |
| | | | 337/360 |
| 2015/0092311 A1* | 4/2015 | Wang | H02H 1/043 |
| | | | 361/86 |
| 2016/0202304 A1* | 7/2016 | Beierschmitt | H02H 3/20 |
| | | | 361/42 |
| 2016/0204596 A1* | 7/2016 | Horinouchi | H01H 9/547 |
| | | | 361/101 |
| 2016/0268886 A1* | 9/2016 | Duncan | H02J 3/01 |
| 2017/0256934 A1* | 9/2017 | Kennedy | H01H 9/548 |
| 2019/0334340 A1* | 10/2019 | Niehoff | H01H 33/596 |

FOREIGN PATENT DOCUMENTS

| | | |
|---|---|---|
| CN | 103731121 A | 4/2014 |
| CN | 102563995 A | 7/2021 |
| DE | 41 02 728 A1 | 8/1991 |
| DE | 198 13 471 A1 | 9/1999 |
| DE | 103 59 736 A1 | 7/2005 |
| DE | 10 2010 042 609 A1 | 4/2012 |
| DE | 10 2015 000 576 A1 | 7/2016 |
| EP | 0 096 601 A1 | 12/1983 |
| EP | 0 474 186 A2 | 3/1992 |
| EP | 1 667 302 A2 | 6/2006 |
| EP | 2 720 053 A2 | 4/2014 |
| WO | WO 03/071659 A1 | 8/2003 |
| WO | WO 2016/147179 A1 | 9/2016 |

\* cited by examiner

ARRANGEMENT FOR PROTECTING ELECTRICAL LOADS AND THE CONNECTION LINES THEREOF FROM OVERCURRENT

CROSS-REFERENCE TO RELATED APPLICATIONS

This application is a 371 national phase filing of International Application No. PCT/EP2017/081923/081923, entitled "ARRANGEMENT FOR PROTECTING ELECTRICAL LOADS AND THE CONNECTION LINES THEREOF FROM OVERCURRENT", filed 7 Dec. 2017, which claims priority to Luxembourg Patent Application No. 93345, entitled "Schutzanordgnung von elektrischen Verbrauchern und deren Anschlussleitungen vor Überstrom", filed 8 Dec. 2016.

BACKGROUND

The present disclosure relates to an arrangement for protecting electrical loads and the connection lines thereof from overcurrent. A generic protective arrangement of this type has an input at which an input current is supplied to the protective arrangement from a current supply as well as at least one output to which a connection line for supplying a load with current is connectable. A current supply path is thereby arranged between the input and the output in which a separator element is in turn arranged to interrupt the current flow upon overcurrent.

Such a protective arrangement is known from the DE 103 59 736 A1 document. The protective arrangement (safety system) therein is connected between the current supply and the load within the load circuit of a motor vehicle, whereby the current in the load circuit is compared to a threshold value and the separator element (circuit breaker transistor or relay) activated as a function thereof and the load circuit interrupted.

The wiring in a motor vehicle, i.e. the connecting of loads via connection lines, is usually preset and only done once. The line cross-section of the connection lines is thereby already dimensioned for a maximum current which the current supply is able to supply.

With current-fed loads in the industrial environment, the wiring is first made in the switch cabinet and varies individually depending upon application.

In order to be able to reduce the line cross-section of the connection lines connected to the current supply, the prior art provides for upstream safety fuses for safety reasons.

However, the use of safety fuses is complicated and comparatively expensive. In addition, adapting the line cross-section requires changing the safety fuse, which is coupled with substantial expenditure.

SUMMARY

It is thus the task of the present disclosure to develop a protective arrangement which is able to easily, flexibly and safely protect electrical loads and the connection lines thereof from overcurrent.

This task is solved by the features of the claims.

In the protective arrangement according to the present disclosure, two path circuit breakers are arranged in a series connection in the current supply path between the input and the at least one output for interrupting the current flow. The protective arrangement thereby comprises a setting unit via which a trip current is settable for at least one of the path circuit breakers upon the exceeding of which the path circuit breaker interrupts the current flow. The maximum current flow can in this way be flexibly adapted to the line cross-section of the connection line to be connected to the respective output. The two path circuit breakers being connected in series ensures that even in the event of failure of one path circuit breaker, the other can safely cut off the current flow.

This can be achieved in one example by both path circuit breakers independently interrupting the current flow upon the same trip current being exceeded. The trip current is thereby settable for both path circuit breakers via a common setting unit or via two separate setting units.

In a further example, this is achieved by testing the operability of the path current switch which interrupts the current flow upon the set trip current being exceeded, whereby the other path circuit breaker automatically interrupts the current flow when the tested path circuit breaker is not functional. When MOS-FET type transistors are used as path circuit breakers, the functional testing preferably ensues by reducing the gate voltage triggering a so-called longitudinal control which, in a functional MOS-FET, causes a higher voltage across the MOS-FET. This voltage is then measured and evaluated for the functional test.

The flexibility notwithstanding, the inventive series connection of two path circuit breakers achieves a reliability as provided by a safety fuse.

Preferably, a current sensor is arranged in the current supply path which measures the current in the current supply path with connected load, wherein at least one of the path circuit breakers interrupts the current flow when the measured current is higher than its set trip current.

In many applications, the protective arrangement not only comprises one output but several. The input current is thereby divided at a nodal point into two or more current supply paths, whereby a respective output is arranged at the end of each current supply path to which a connection line for supplying a load with current is connectable.

In one example in conjunction with a plurality of current supply paths/outputs, two path circuit breakers are arranged in each current supply path, whereby in a first variant, both path circuit breakers interrupt the current flow independently of one another upon the set trip current being exceeded or, in a second variant, a check is made of the operability of the path current switch which interrupts the current flow upon the set trip current being exceeded, wherein the other path circuit breaker automatically interrupts the current flow when the tested path circuit breaker is not functional.

In a further example in conjunction with a plurality of current supply paths/outputs, only one path circuit breaker is arranged in each current supply path, its trip current being settable by a setting unit, whereby an additional path circuit breaker is arranged in an input current path here between the input and the nodal point as a main circuit breaker. The adapting and testing of the maximum current flow for the line cross-section of the connection line to be connected to the respective output thereby ensues via the respective path circuit breaker in the current supply path. The main circuit breaker serves the added safety in that it interrupts the current flow right in the input current path when one of the path circuit breakers is not functional or when the current in the input current path is higher than a set trip current.

Preferably, the protective arrangement comprises an evaluation and control unit (e.g. in the form of a microcontroller) connected to all the path circuit breakers and, as applicable, to the main circuit breaker as well as the current sensors in order to control the interruption of current flow as a function of the measured currents and the operability/inoperability of the path circuit breakers and main circuit breaker as applicable.

BRIEF DESCRIPTION OF THE DRAWINGS

The principles of this disclosure will be explained in greater detail with reference to the accompanying drawings.

DETAILED DESCRIPTION

Figure 1:
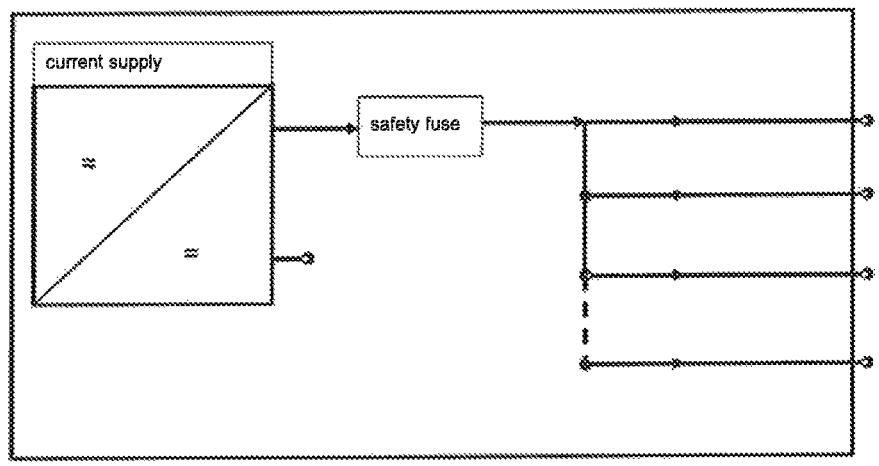
FIG. 1 shows a first example of a protective arrangement.

FIG. 1 shows a protective arrangement according to the prior art in conjunction with a current supply, wherein the current supply and protective arrangement are integrated into a power supply unit. In the depicted example, the current supplied by the current supply is divided into different current supply paths, each having an output ($A_1$, $A_2$, $A_3$, $A_N$) for the connection of a connection line to supply a load (connection line and load not depicted). A safety fuse is thereby located in the input current path of the protective arrangement ahead of the split into the individual current supply paths. Individual protective adaptation to the line cross-sections of the connection lines is thus not possible.

Figure 1A:
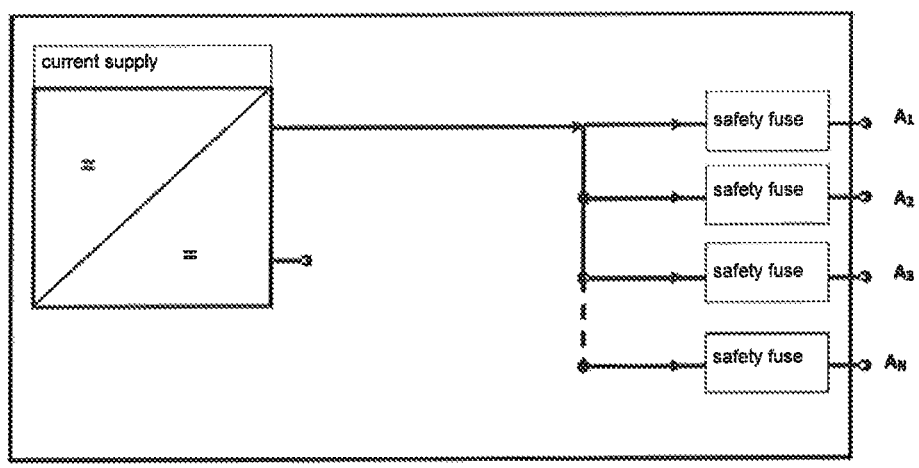
FIG. 1A shows a second example of a protective arrangement.

FIG. 1A shows an arrangement according to the prior art as in FIG. 1, however wherein one safety fuse is in each case provided in each current supply path. Although individual protective adaptation to the line cross-sections of the connection lines is thus possible due to the alternative with different fuses, there is no simple and flexible response to changing a line cross-section since the respective fuse in each case needs to be replaced, which usually also requires a dismantling and opening of the housing in which the protective arrangement is located.

Figure 2:
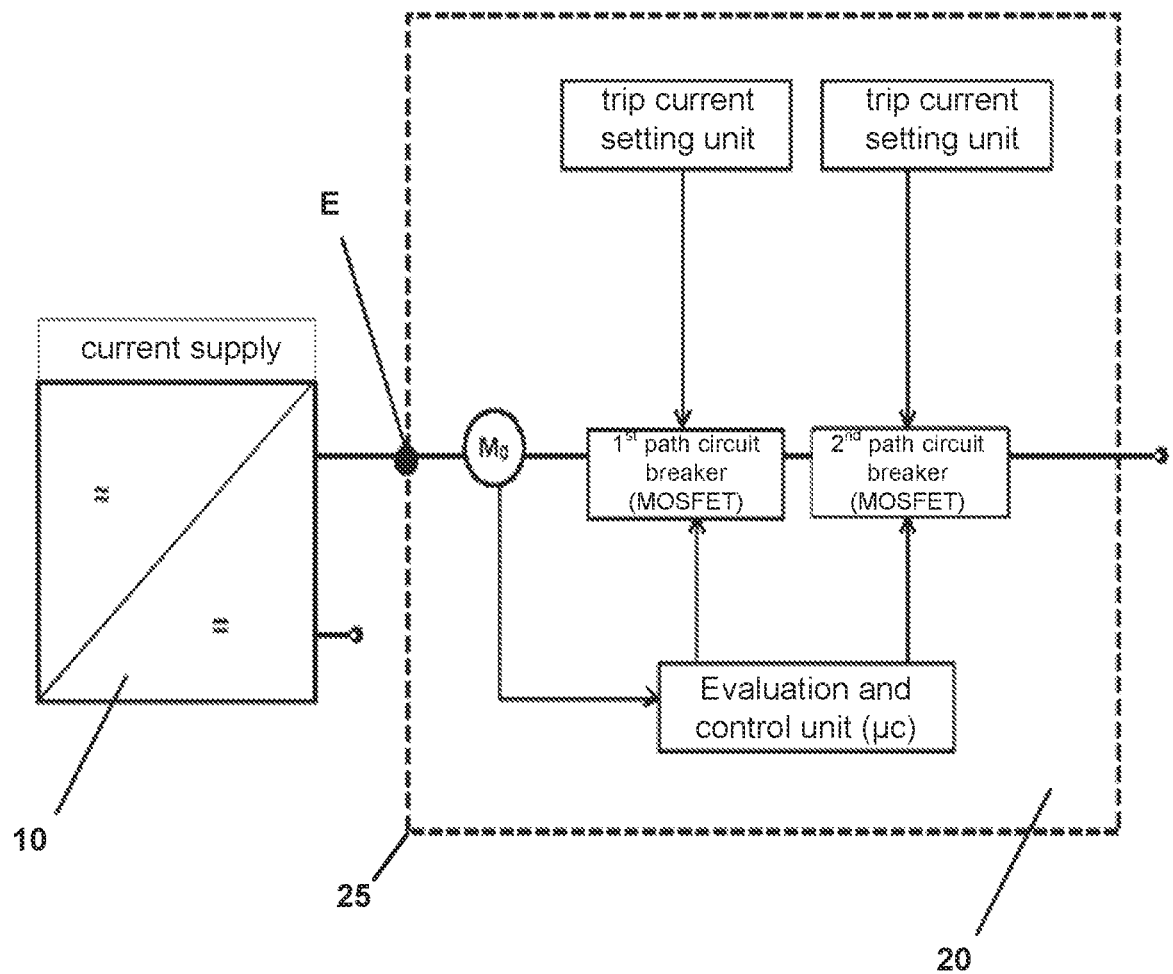
FIG. 2 shows a first example of a protective arrangement according to the principles of this disclosure.

FIG. 2 shows a first example of an inventive protective arrangement (20). The protective arrangement (20) thereby comprises an input (E) at which the protective arrangement (20) is fed an input current by a current supply (10) as well as an output (A) to which a connection line for supplying a load with current can be connected. A current supply path is arranged between the input (E) and the output (A). The protective arrangement (20) may be housed within a housing (25), independent of the current supply, which may be configured to detachably mount to a support rail. In accordance with the principles of this disclosure, a first and a second path circuit breaker for interrupting the current flow are arranged in series connection in the current supply path. With the inventively used path circuit breakers, the trip current—in contrast to a safety fuse—is not predefined but rather adjustable. Moreover, the inventively used path circuit breakers are reversibly actuable. As shown in this example, transistors, such as MOS-FETs, are in particular suitable as path circuit breakers. Alternatively, relays also may be suitable as path circuit breakers.

Figure 3:
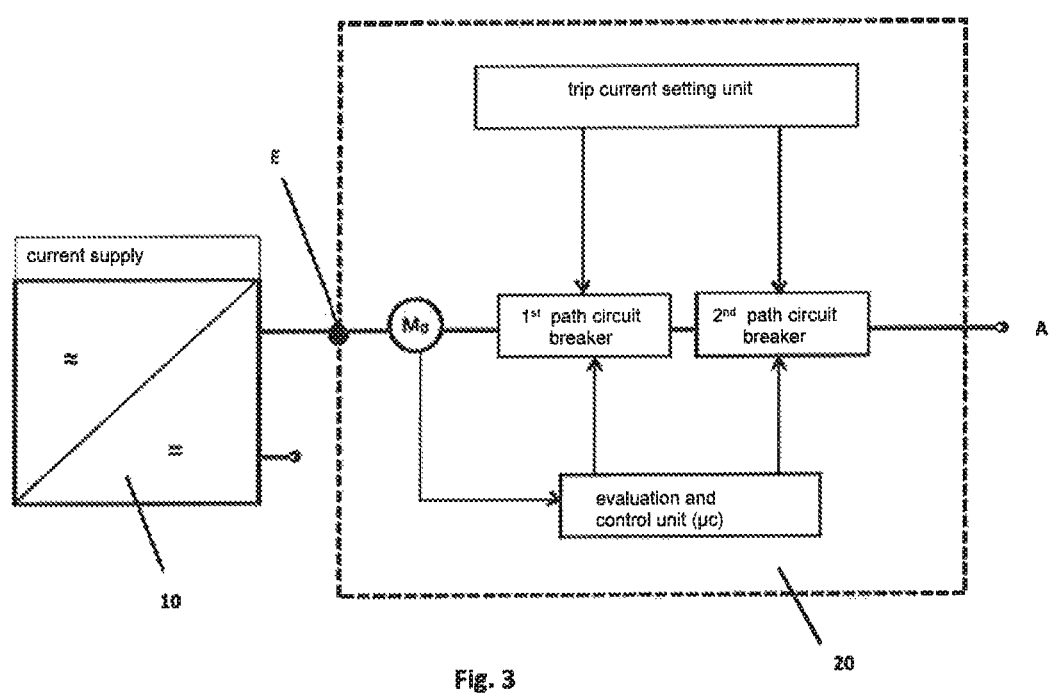
FIG. 3 shows a further example of a protective arrangement according to the principles of this disclosure.

To set the trip current, one variant provides for each path circuit breaker to have its own separate setting unit. In a further variant (see FIG. 3), one common setting unit is provided for both path circuit breakers. A rotary potentiometer or a DIP switch is, for example, used as a setting unit. However, also provided for is using the user interface of a computer program as a setting unit. A value for the trip current or even a line cross-section for the line to be connected to the respective output can thereby be directly selected via the setting unit, whereby the suitable trip current for the line cross-section is then determined and set by way of an allocation (function or table) stored in the protective arrangement.

An example of one such table is:

| line cross-section ($mm^2$) | trip current (amperes) = current not to be exceeded |
|---|---|
| 0.75 | 5 |
| 1 | 7 |
| 1.5 | 10 |
| 2.5 | 15 |

The setting of the trip current can directly act on the path circuit breaker(s). It is, however, preferably also provided for the set value for the respective trip current to be stored in an evaluation and control unit (µC).

A current sensor ($M_0$) which measures the current in the current supply path is arranged in the current supply path. When the measured current exceeds the set trip current, at least one of the two path circuit breakers interrupts the current flow. The protective arrangement (20) thereby preferably comprises an evaluation and control unit in the form of a microcontroller (µC) which receives the measured values of the current sensor ($M_0$) and compares same to stored trip current values, wherein whenever the measured value exceeds the trip current, the evaluation and control unit activates the path circuit breaker to interrupt the current.

In a first variant, both path circuit breakers will interrupt the current flow independently upon the set trip current being exceeded. In a second variant, only one of the two path circuit breakers interrupts the current flow upon the exceeding of the set trip current. Although the operability of said path current switch is also tested in this variant, whereby the other path circuit breaker serves to automatically interrupt the current flow when the tested path circuit breaker is not functional.

When MOS-FET type transistors are used as path circuit breakers, the functional testing preferably ensues by reducing the gate voltage triggering a so-called longitudinal control which, in a functional MOS-FET, causes a higher voltage across the MOS-FET. This voltage is then measured and evaluated for the functional test.

The test signal is preferably sent to the evaluation and control unit (µC), which then effects the actuating of the respective other path circuit breaker.

Figure 4:
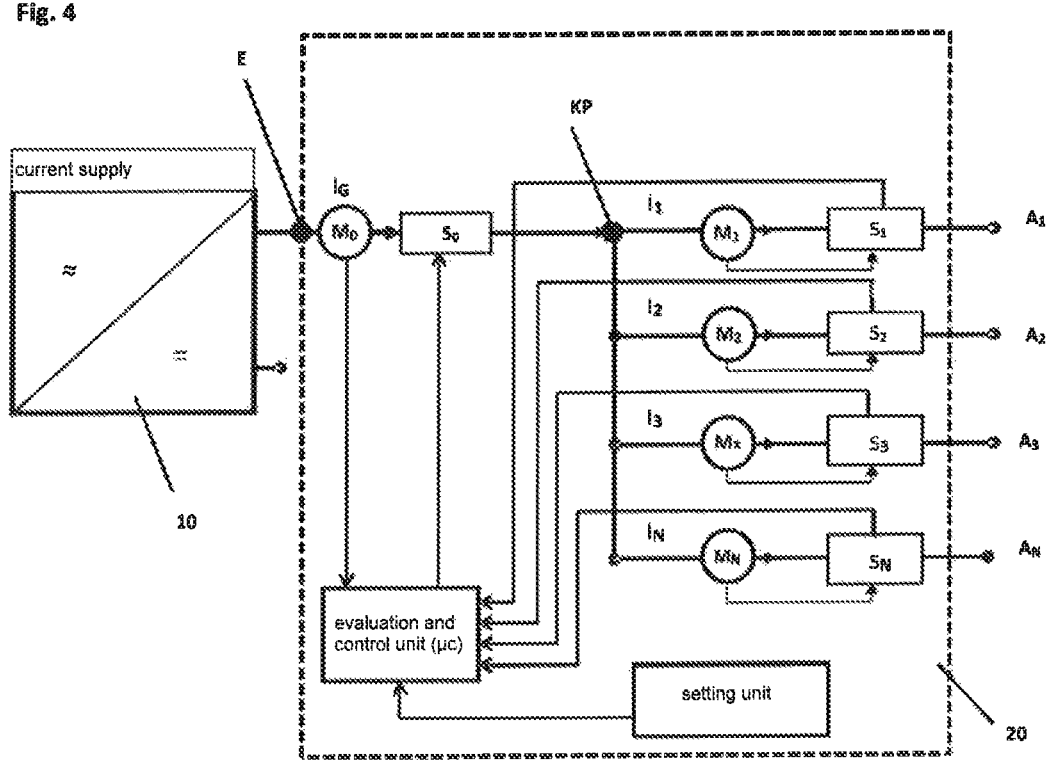
FIG. 4 shows a further example of a protective arrangement according to the principles of this disclosure.

FIG. 4 depicts a protective arrangement (20) for a plurality of outputs ($A_1$, $A_2$, $A_3$, $A_N$). The input current is thereby divided into multiple current supply paths at a nodal point (KP), whereby an output ($A_1$, $A_2$, $A_3$, $A_N$) to which a connection line can be connected for supplying an electrical load with current is in each case arranged at the end of a current supply path. A path circuit breaker ($S_1$, $S_2$, $S_3$, $S_N$) is thereby arranged in each current supply path, the trip current of which can be set via a setting unit (not depicted in this figure for the sake of clarity). A current sensor ($M_1$, $M_2$, $M_3$, $M_N$) is additionally arranged in each current supply path for measuring the respective path current ($I_1, I_2, I_3, I_N$). The values measured by the current sensors ($M_1, M_2, M_3, M_N$) are transmitted to the evaluation and control unit (µC), in which the trip current values for the respective path circuit breaker ($S_1, S_2, S_3, S_N$) are also stored. If the current in one of the current supply paths exceeds the respective trip current, the corresponding path circuit breaker ($S_1, S_2, S_3, S_N$) is triggered by the evaluation and control unit (µC) so as to interrupt the current flow in its current supply path.

For safety reasons, a further path circuit breaker ($S_0$) is arranged in an input current path between the input (E) and the nodal point (KP) as a main circuit breaker. It automatically interrupts the current flow in the input current path if one of the other path circuit breakers ($S_1, S_2, S_3, S_N$) is not functional. The functional testing of the path circuit breakers ($S_1, S_2, S_3, S_N$) and the activation of the main circuit breaker ($S_0$) preferably involves the evaluation and control unit (µC).

It is additionally optionally provided for a current sensor ($M_0$) to also be arranged in the input current path, wherein the main circuit breaker ($S_0$) then also additionally interrupts the current flow in the input current path when the measured current ($I_G$) is higher than the trip current set for the main circuit breaker ($S_0$).

Figure 5:
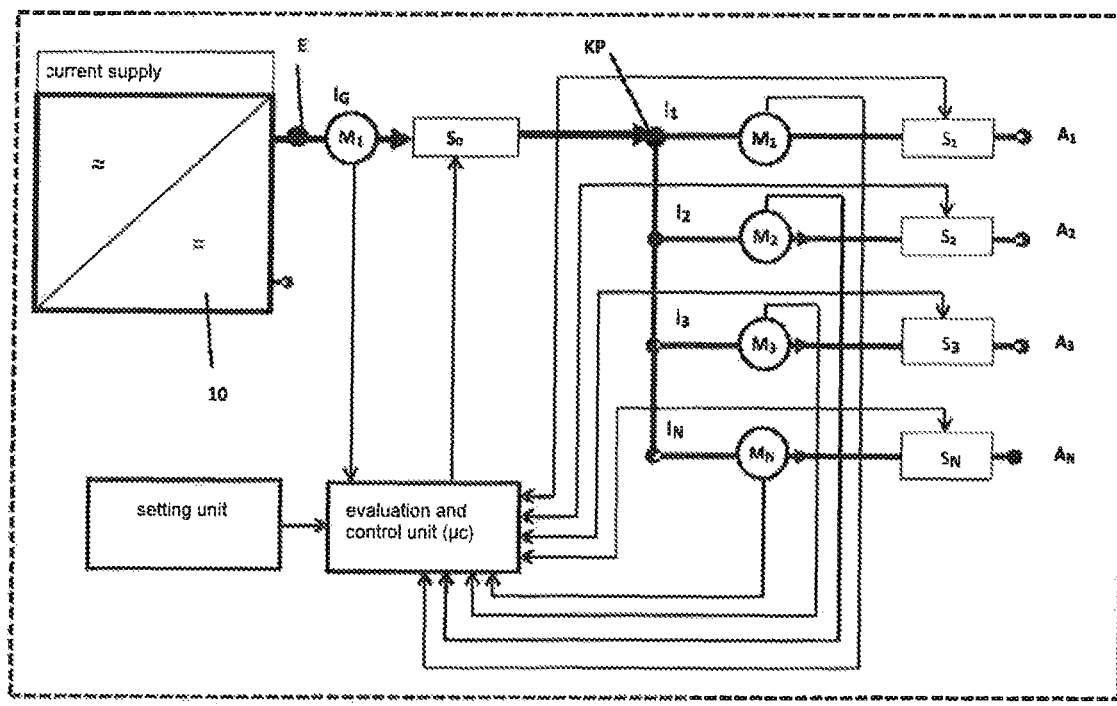
FIG. 5 illustrates a further example of a protective arrangement according to the principles of this disclosure.

FIG. 5 depicts the same protective arrangement as in FIG. 4. Although the protective arrangement in this example is—unlike in FIG. 4—not integrated into one unit with the current supply.

Figure 6:
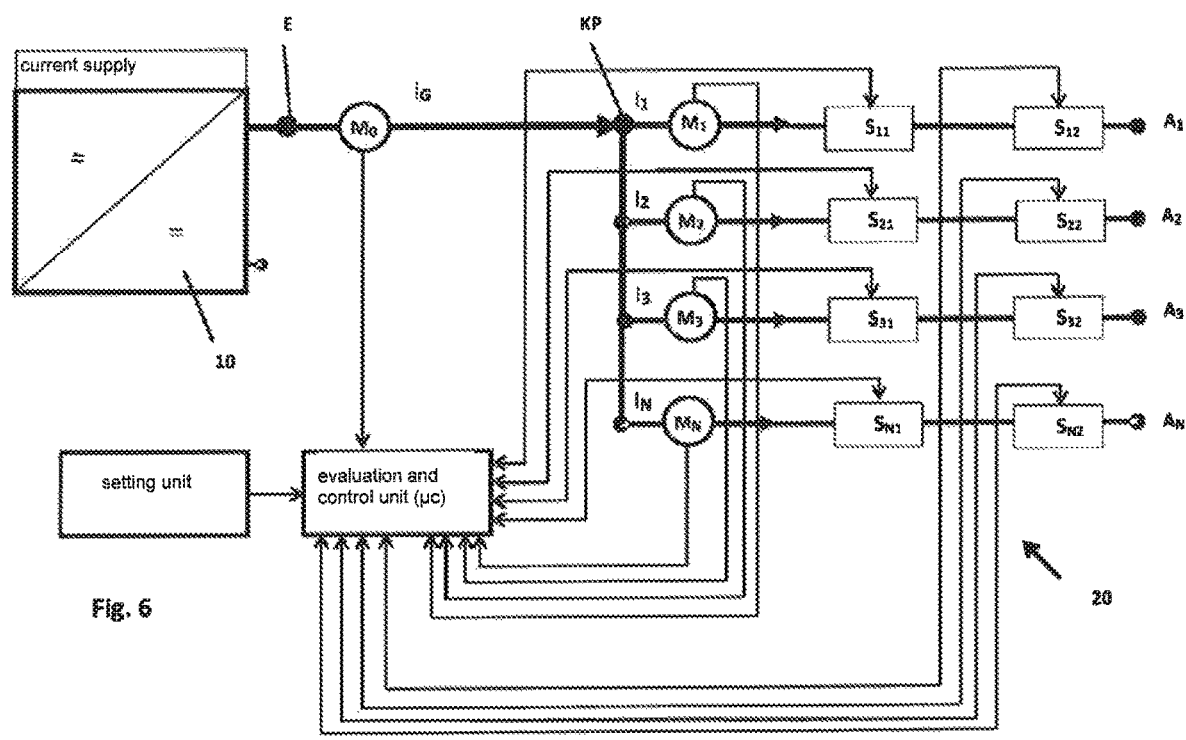
FIG. 6 illustrates a further example of a protective arrangement according to the principles of this disclosure.

In the example according to FIG. 6, two path circuit breakers ($S_1, S_2, S_{21}, S_{22}, S_{31}, S_{32}, S_{N1}, S_{N2}$) and one current sensor ($M_1, M_2, M_3, M_N$) are in each case arranged in each of the current supply paths for double protection. The path circuit breakers ($S_1, S_{12}, S_{21}, S_{22}, S_{31}, S_{32}, S_{N1}, S_{N2}$) as well as the current sensors ($M_1, M_2, M_3, M_N$) are connected to the evaluation and control unit (µC). For the sake of clarity, the setting unit or setting units respectively for the trip currents of the path circuit breakers is/are not depicted. Each path circuit breaker can be provided its own setting unit. However, it is also provided for there to be only one setting unit, wherein then, however, a further selection unit is provided for selecting the respective path circuit breaker for which the setting unit is to set its trip current. The user interface of a computer program is also suitable as a setting unit.

The operation of the protective arrangement according to FIG. 6 with regard to each current supply path is thereby the following:

In a first variant, both path circuit breakers will interrupt the current flow independently of each other upon the set trip current being exceeded.

In a second variant, only one of the two path circuit breakers interrupts the current flow upon the set trip current being exceeded. Although the operability of said path current switch is also tested in this variant, whereby the other path circuit breaker serves to automatically interrupt the current flow when the tested path circuit breaker is not functional.

The protective arrangement (20) can be integrated into one power supply unit together with the current supply (10) or arranged independent of the current supply (10) in a housing detachably mountable to a support rail.

What is claimed is:

1. A protective arrangement configured to protect electrical loads and connection lines from overcurrent, comprising:
an input configured to receive an input current from a current supply;
one or more outputs configured to connect to one or more connection lines to supply current to one or more electric loads;
one or more current supply paths arranged between the input and the one or more outputs;
a first path circuit breaker and a second path circuit breaker arranged in a series connection in a current supply path of the one or more current supply paths and configured to interrupt a current flow in the current supply path; and
one or more setting units configured to set a trip current for at least one of the first path circuit breaker or the second path circuit breaker such that if the current flow in the current supply path exceeds the trip current the at least one of the first path circuit breaker or the second path circuit breaker interrupts the current flow;
wherein the second path circuit breaker is configured to automatically interrupt the current flow when a test indicates that the first path circuit breaker is not functional;
wherein the first path circuit breaker is a metal oxide semiconductor field effect transistor (MOS-FET), and wherein the test comprises measuring a change in voltage across the MOS-FET in response to a reduction in a gate voltage of the MOS-FET.

2. The protective arrangement according to claim 1, Wherein the one or more setting units are configured to set the trip current for both path circuit breakers.

3. The protective arrangement according to claim 1, further comprising:
one or more current sensors arranged in the one or more current supply paths, wherein a current sensor of the one or more current sensors is arranged in the current supply path of the one or more current supply paths and configured to measure the current flow in the current supply path with an electric load of the one or more electric loads connected, wherein at least one of the first path circuit breaker or the second path circuit breaker is configured to interrupt the current flow when the measured current flow is higher than the set trip current.

4. The protective arrangement according to claim 3, further comprising:
an evaluation and control unit configured to receive one or more measured vales of the one or more current sensors and compare the measured values to one or more stored values corresponding to respective trip currents, wherein the evaluation and control unit is further configured to trip the first path circuit breaker or the second path circuit breaker if a measured value of a current sensor of the one or more current sensors exceeds the trip current of the first path circuit breaker or the second path circuit breaker.

5. The protective arrangement according to claim 4, wherein the evaluation and control unit is further configured to receive information on the operability of one of the first path circuit breaker or the second path circuit breaker and trip the other of the first path circuit breaker or the second path circuit breaker to interrupt the current flow based on the received information.

6. The protective arrangement according to claim 1, Wherein the input current is divided at a nodal point into each current supply path of the one or more current supply paths, and each output of the one or more outputs is arranged at a respective end of a respective current supply path of the one or more current supply paths;

wherein each current supply path comprises a respective pair of circuit breakers, wherein at least a trip current of a path circuit breaker of the pair of path circuit breakers is settable via a setting unit of the one or more setting units.

7. The protective arrangement according to claim 1,
wherein the input current is divided at a nodal point into each current supply path of the one or more current supply paths, and each output of the one or more outputs is arranged at a respective end of a respective current supply path of the one or more current supply paths;
wherein each current supply path comprises a respective single path circuit breaker, wherein a trip current of each single path circuit breaker of each current supply path is settable via a setting unit of the one or more setting units;
wherein a main path circuit breaker is arranged in an input current path between the input and the nodal point.

8. The protective arrangement according to claim 7, further comprising:
a plurality of current sensors, wherein a current sensor of the plurality of current sensors is arranged in each current supply path and configured to measure a respective current flow in the current supply path when concocted to a load of the one or more loads, wherein the path circuit breaker of the current supply path is configured to interrupt the current flow when the measured current flow is higher than the set trip current for that path circuit breaker.

9. The protective arrangement according to claim 7, wherein a trip current for the main circuit breaker is settable via a setting unit of the one or more setting units.

10. The protective arrangement according to claim 9, further comprising:
a current sensor arranged in the one or more current supply paths and configured to measure a current flow in the one or more current supply paths when a load of the one or more loads is connected to an output of the one or more outputs, wherein the main circuit breaker is configured to interrupt the current flow in the one or more current supply paths when the measured current flow is higher than the set trip current.

11. The protective arrangement according to claim 7, Wherein the main circuit breaker is configured to automatically interrupt the current flow in the input current path when the single path circuit breaker in a respective current supply path is not functional.

12. The protective arrangement according to claim 1, wherein the second path circuit breaker is metal oxide semiconductor field-effect (MOS-FET) type transistors.

13. The protective arrangement according to claim 1, wherein the protective arrangement is integrated into a power supply unit together with the current supply.

14. The protective arrangement according to claim 1, wherein the protective arrangement is arranged independent of the current supply in a housing.

* * * * *